US010671662B2

(12) United States Patent
Lieberknecht et al.

(10) Patent No.: US 10,671,662 B2
(45) Date of Patent: *Jun. 2, 2020

(54) METHOD AND SYSTEM FOR ANALYZING AN IMAGE GENERATED BY AT LEAST ONE CAMERA

(71) Applicant: Apple Inc., Cupertino, CA (US)

(72) Inventors: Sebastian Lieberknecht, Sunnyvale, CA (US); Peter Meier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/919,892

(22) Filed: Mar. 13, 2018

(65) Prior Publication Data

US 2018/0307708 A1     Oct. 25, 2018

Related U.S. Application Data

(63) Continuation of application No. 15/044,009, filed on Feb. 15, 2016, now Pat. No. 9,916,330, which is a (Continued)

(51) Int. Cl.
*G06F 16/532* (2019.01)
*G06F 16/93* (2019.01)
(Continued)

(52) U.S. Cl.
CPC .......... *G06F 16/532* (2019.01); *G06F 16/583* (2019.01); *G06F 16/5838* (2019.01);
(Continued)

(58) Field of Classification Search
CPC .. G06F 16/532; G06F 16/5838; G06F 16/583; G06F 16/93; G06F 3/011;
(Continued)

(56) References Cited

U.S. PATENT DOCUMENTS 5,568,384 A    10/1996  Robb
5,802,361 A     9/1998  Wang
(Continued)

OTHER PUBLICATIONS

Feng et al. "Filtering Large Fingerprint Database for Latent Matching." 19th International Conference on Pattern Recognition, Dec. 8, 2008, 4 pages (Year: 2008).*
(Continued)

*Primary Examiner* — Jon Chang
(74) *Attorney, Agent, or Firm* — Blank Rome LLP

(57) ABSTRACT

A method for analyzing an image of a real object, generated by at least one camera includes the following steps: generating at least a first image by the camera capturing at least one real object, defining a first search domain comprising multiple data sets of the real object, each of the data sets being indicative of a respective portion of the real object, and analyzing at least one characteristic property of the first image with respect to the first search domain, in order to determine whether the at least one characteristic property corresponds to information of at least a particular one of the data sets of the first search domain. If it is determined that the at least one characteristic property corresponds to information of at least a particular one of the data sets, a second search domain comprising only the particular one of the data sets is defined and the second search domain is used for analyzing the first image and/or at least a second image.

20 Claims, 4 Drawing Sheets

Related U.S. Application Data continuation of application No. 14/198,146, filed on Mar. 5, 2014, now Pat. No. 9,262,678, which is a continuation of application No. 13/128,372, filed as application No. PCT/EP2008/009481 on Nov. 10, 2008, now Pat. No. 8,675,965.

(51) Int. Cl.
    *G06K 9/00* (2006.01)
    *G06F 3/01* (2006.01)
    *G06F 16/583* (2019.01)

(52) U.S. Cl.
    CPC ......... *G06F 16/93* (2019.01); *G06K 9/00442* (2013.01); *G06K 9/00671* (2013.01); *G06F 3/011* (2013.01)

(58) Field of Classification Search
    CPC ......... G06F 17/30277; G06F 17/30011; G06F 17/30247; G06F 17/30256; G06F 17/30244; G06K 9/00671; G06K 9/00442
    See application file for complete search history.

(56) References Cited

U.S. PATENT DOCUMENTS

| | | | |
|---|---|---|---|
| 7,023,536 | B2 | 4/2006 | Zhang |
| 7,038,846 | B2 | 5/2006 | Mandella |
| 7,088,440 | B2 | 8/2006 | Buermann |
| 7,110,100 | B2 | 9/2006 | Buermann |
| 7,113,270 | B2 | 9/2006 | Buermann |
| 7,161,664 | B2 | 1/2007 | Buermann |
| 7,203,384 | B2 | 4/2007 | Carl |
| 7,268,956 | B2 | 9/2007 | Mandella |
| 7,474,809 | B2 | 1/2009 | Carl |
| 7,729,515 | B2 | 6/2010 | Mandella |
| 7,826,641 | B2 | 11/2010 | Mandella |
| 7,961,909 | B2 | 6/2011 | Mandella |
| 8,295,584 | B2 | 10/2012 | Sato |
| 8,675,965 | B2 | 3/2014 | Lieberknecht |
| 9,262,678 | B2 | 2/2016 | Lieberknecht |
| 9,916,330 | B2 * | 3/2018 | Lieberknecht ..... G06K 9/00442 |
| 2003/0013951 | A1 | 1/2003 | Stefanescu |
| 2003/0152293 | A1 | 8/2003 | Bresler |
| 2005/0168437 | A1 | 8/2005 | Carl |
| 2006/0262352 | A1 | 11/2006 | Hull |
| 2008/0253623 | A1 | 10/2008 | Hauke |
| 2008/0298642 | A1 * | 12/2008 | Meenen ............... G06K 9/00 382/115 |
| 2010/0166261 | A1 | 7/2010 | Tsuji |
| 2011/0227915 | A1 | 9/2011 | Mandella |
| 2011/0286628 | A1 | 11/2011 | Goncalves |
| 2012/0038549 | A1 | 2/2012 | Mandella |
| 2013/0194418 | A1 | 8/2013 | Gonzalez-Banos |

OTHER PUBLICATIONS

Billinghurst et al. "The MagicBook—Moving Seamlessly between Reality and Virtuality." IEEE Computer Graphics and Applications, May 2001, pp. 6-8 (Year: 2001).*
Antunez et al., "Hotpaper: Multimedia Interaction with Paper using Mobile Phones," <http://delivery.acm.org/10.1145/146000/1459413/p399-erol.pdf?key1=1459413&key2=9373045321&coll+ACM&dl=ACM&CFID=23241788&CFTOKEN=22489258>; 2008.
Bay et al., "SURF: Speeded Up Robust Features," Proceedings of the Ninth European Conference on Computer Vision, May 2006.
Billinghurst, Mark, "The Magic Book: A Transitional AR Interface," Computers and Graphics, 25(5), 2001, pp. 745-753.
Gupta et al., "The Universal Media Book: Tracking and Augmenting Moving Surfaces with Projected Information," IEEE/ACM International Symposium on Mixed and Augmented Reality, Oct. 22, 2006, pp. 177-180.
Hinterstoisser et al., "Online Learning of Patch Perspective Rectification for Efficient Object Detection," IEEE Computer Society Conference on Computer Vision and Pattern Recognition, Jun. 2008.
Hull et al., "Paper-Based Augmented Reality," 17th International Conference on Artificial Reality and Telexistence, Nov. 1, 2007, pp. 205-209.
Lepetit et al., "Randomized Trees for Real-Time Keypoint Recognition," Conference on Computer Vision and Pattern Recognition, Jun. 2005.
Lowe, "Distinctive Image Features from Scale-Invariant Keypoints," International Journal of Computer Vision 60 (2), 91-110, 2004.
McKenzie et al., "The eyeMagic Book—A Report Into Augmented Reality Storytelling in the Context of Children's Workshop," 2003.
Mikolajczyk et al., "Shape Recognition with Edge-Based Features," Proceedings of the British Machine Vision Conference, 2003.
Nougaret et al., "An Information Appliance Capable of Seamless Screen-Display Atop Printed Matter: Towards Paper-Anchored Hypertext and Multimedia," Proceedings International Conference on Image Processing, vol. 1, 2001, pp. 1110-1113.
Scherrer et al., "The Haunted Book," 7th IEEE/ACM International Symposium on Mixed and Augmented Reality, Sep. 15, 2008, pp. 163-164.

* cited by examiner

METHOD AND SYSTEM FOR ANALYZING AN IMAGE GENERATED BY AT LEAST ONE CAMERA

CROSS-REFERENCE TO RELATED APPLICATIONS

This application is a continuation of U.S. patent application Ser. No. 15/044,009 filed Feb. 15, 2016, now U.S. Pat. No. 9,916,330, which is a continuation of U.S. patent application Ser. No. 14/198,146 filed Mar. 5, 2014, now U.S. Pat. No. 9,262,678, which is a continuation of U.S. patent application Ser. No. 13/128,372 filed Aug. 1, 2011, now U.S. Pat. No. 8,675,965, which application claims the benefit of, and incorporates by reference essential subject matter disclosed in PCT Application No. PCT /EP2008/009481 filed on Nov. 10, 2008, of all of which are incorporated herein by reference in their entireties.

BACKGROUND OF THE INVENTION

1. Technical Field

The present invention is directed to a method and system for analyzing an image generated by at least one camera, wherein the at least one image is generated by the camera capturing at least one print media object.

2. Background Information

In the prior art there are known applications which augment print media objects, such as conventional books, with virtual objects using the so called Augmented Reality (AR) technology: H.K.U.I.P. Mark Billinghurst, The Magic Book: A transitional AR interface, Computers and Graphics, 25(5), 2001, pages 745-753 and John McKenzie and Doreen Darnell, The eyeMagic Book—A Report into Augmented Reality Storytelling in the Context of a Children's Workshop, 2003.

In such application, a camera coupled to a computer takes a picture of a book read by a person, wherein the book is displayed on a display screen and virtual objects may be displayed in addition to the image of the real world containing the book, so that the book displayed on the display screen is augmented with virtual objects of any kind on a display screen. In such application, in order to augment the image with virtual objects, there is the need for the computer system to identify the real object, such as a respective page of the book, and its position and orientation with respect to the camera in order to correctly display the virtual object in the image taken by the camera.

Generally, each double page, i.e. the pages of the book which are simultaneously visible when reading the book, is represented by a respective data set stored in the computer system. When the book is positioned with an opened double page on a table, for example, and the camera is taking an image of the book, the image of the camera is capturing the double page opened in front of the camera. For identifying a particular double page of the book in order to correctly display the virtual object in the image of that double page, the computer system is required to compare one or more features of the image taken by the camera with all of the data sets stored in the computer system for the book, which process is rather time consuming and requires large processing performance of the computer system.

It is therefore an object of the invention to provide a method and a system for analyzing an image of a real object generated by at least one camera which may be performed with reduced processing requirements and/or at a higher processing speed.

SUMMARY OF THE INVENTION

According to a first aspect of the invention, there is disclosed a method for analyzing an image of a real object generated by at least one camera, wherein the method comprises the following steps: generating at least a first image by the camera capturing at least one real object, defining a first search domain comprising multiple data sets of the real object, each of the data sets being indicative of a respective portion of the real object, and analyzing at least one characteristic property of the first image of the camera with respect to the first search domain, in order to determine whether the at least one characteristic property corresponds to information of at least a particular one of the data sets of the first search domain. If it is determined that the at least one characteristic property corresponds to information of at least a particular one of the data sets, the method includes the step of defining a second search domain comprising a reduced number of the data sets compared to the first search domain and using the second search domain for analyzing the first image and/or at least a second image generated by the camera.

Therefore, the method provides the advantage that for analyzing at least a second and following images generated by the camera, any predefined search domain used for analyzing the images may be significantly reduced to a smaller size, particularly to comprise only the data set or data sets for which a previous correspondence has been found, so that less processing power is needed for the analyzing process and/or the processing speed can be increased.

An embodiment of the invention comprises that the real object is a printed media object which is an advantageous object for which the present invention may be applied.

The invention advantageously uses the inventors' finding that in certain applications all portions of a real object, such as all pages of a book, cannot be captured by the camera simultaneously. Rather, with taking an image of a real object, such as a book, only a particular portion of that object, such as a particular double page of a book, can be captured at a time by the camera. The invention uses this finding in that the search domain for the following analyzing process is reduced to a reduced number of data sets once it has been found that there is a correspondence between at least one characteristic property of the current image and a particular one of the data sets.

Embodiments of a printed media object as understood in the context of the present invention include, for example, a book, a printed magazine, a newspaper, a catalog, a folder or any other type of device used in the same or a similar way or for the same or a similar purpose. Generally, a printed media object, as may be used with the present invention, may be a printed, substantially flat or even object comprising one or more printed pages which may be turned over by a user from one page or double page to another page or double page, respectively, and may be positioned in front of a camera. The invention may also be applied to other types of real objects having portions and corresponding data sets which are not visible simultaneously.

Particularly, the method includes the step of analyzing at least one characteristic property of the second image of the camera with respect to the second search domain, in order to determine whether the at least one characteristic property of the second image corresponds to information of a particular one of the data sets of the second search domain.

According to an embodiment of the invention, the method further includes the step of setting a time period or a number of images captured by the camera for analyzing following images with respect to the second search domain, and if it is determined that none of characteristic properties of the following images corresponds to information of a particular one of the data sets of the second search domain within the set time period or within the number of captured images, the first search domain is used for analyzing at least one further image captured by the camera. Therefore, if the user is changing, for example, to another double page of the book so that the system cannot find a correspondence for that double page in the second search domain, again the first search domain is used for analyzing the new image in order to find another particular one of the data sets corresponding to that double page.

For example, each of the data sets is indicative of a respective page or double page of the printed media object. This embodiment uses the finding that under normal circumstances only two pages of a double page of the printed media object are visible simultaneously, so that the search domain can be reduced accordingly.

The invention, in an embodiment thereof, may be used for augmenting one or more of the images with one or more virtual objects, so that an augmented reality system needs less processing power and/or may operate with higher processing speed. Accordingly, the method may include the steps of displaying the first and second images on image displaying means, wherein the at least one of the images is augmented with at least one virtual object using an Augmented Reality technology.

A further aspect of the invention is concerned with a system for analyzing an image, comprising a camera for generating at least a first and second image capturing at least one real object, and a processing unit connected with the camera. The processing unit is programmed for performing the steps of defining a first search domain comprising multiple data sets of the real object, wherein each of the data sets is indicative of a respective portion of the real object, and analyzing at least one characteristic property of the first image of the camera with respect to the first search domain, in order to determine whether the at least one characteristic property corresponds to information of at least a particular one of the data sets of the first search domain. If it is determined that the at least one characteristic property corresponds to information of at least a particular one of the data sets, a second search domain is defined comprising only the particular one of the data sets. This second search domain is then used for analyzing the first image and/or at least a second image generated by the camera.

Further embodiments and aspects of the invention are evident from the dependent claims.

The invention will now be described in more detail in conjunction with the accompanying drawings which illustrate various embodiments of the invention.

DETAILED DESCRIPTION OF THE INVENTION

Figure 1:
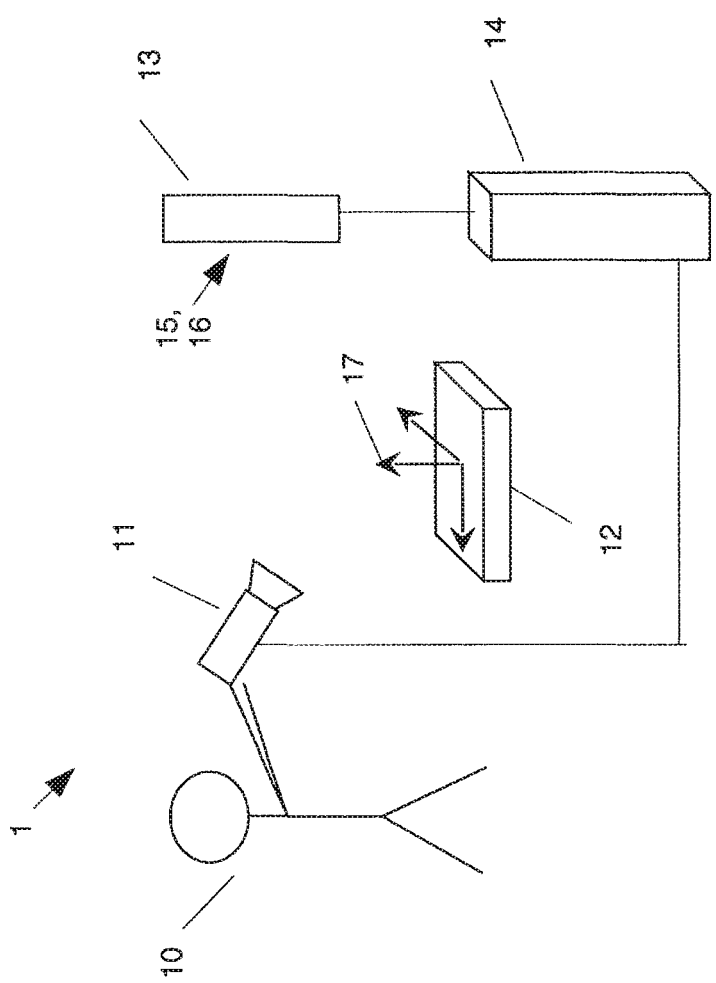
FIG. 1 shows a schematic illustration of a first embodiment of a system according to the invention.

In FIG. 1 there is shown a schematic illustration of a first embodiment of a system according to the invention. Particularly, FIG. 1 shows a system 1 in which a user 10 holds a camera 11 in his or her hand for generating at least one image of the real world, for example of the real object 12 as shown, which is in the present example a printed media object of the type as described herein before. According to a particular example, the real object 12 may be a book which is placed in front of the user 10, and the camera 11 takes an image of the book 12 to be displayed on a display screen. The book 12 is provided with an object coordinate system 17, such as shown in FIG. 1. Further, the camera 11 is coupled with an image displaying means 13, such as a display screen of a personal computer, or the like. However, any other image displaying means may be used which is suitable for displaying an image to a user, such as a head mounted display or any other type of mobile or stationary display device. Furthermore, a processing unit 14, which may be for example a personal computer (PC), is connected with the camera 11 and the image displaying means 13 in wired or wireless fashion. The invention is applicable to embodiments where the camera 11, the processing unit 14 and/or the displaying means 13 are integrated in an apparatus or are distributed components. For example, the camera 11, the processing unit 14 and/or the displaying means 13 may be integrated in a single apparatus such as a mobile phone.

In the situation as shown in FIG. 1 the user holds the camera 11 in his or her hand and is looking at the object 12 placed in front of the user. The camera images, such as a video flow of images, are displayed on the image displaying means 13 placed in front of the user 10. According to an embodiment of the invention, the images may be augmented with one or more virtual objects according to the augmented reality (AR) technology. According to a possible application, the user 10 is taking pictures or a video stream of a book 12, and on the image displaying means 13 the images of the book 12 are shown augmented with virtual information, such as a 3-dimensional virtual illustration of a 2-dimensional object printed on a double page of the book 12 and captured by the camera 11 (typical magic book application as described above).

Figure 2:
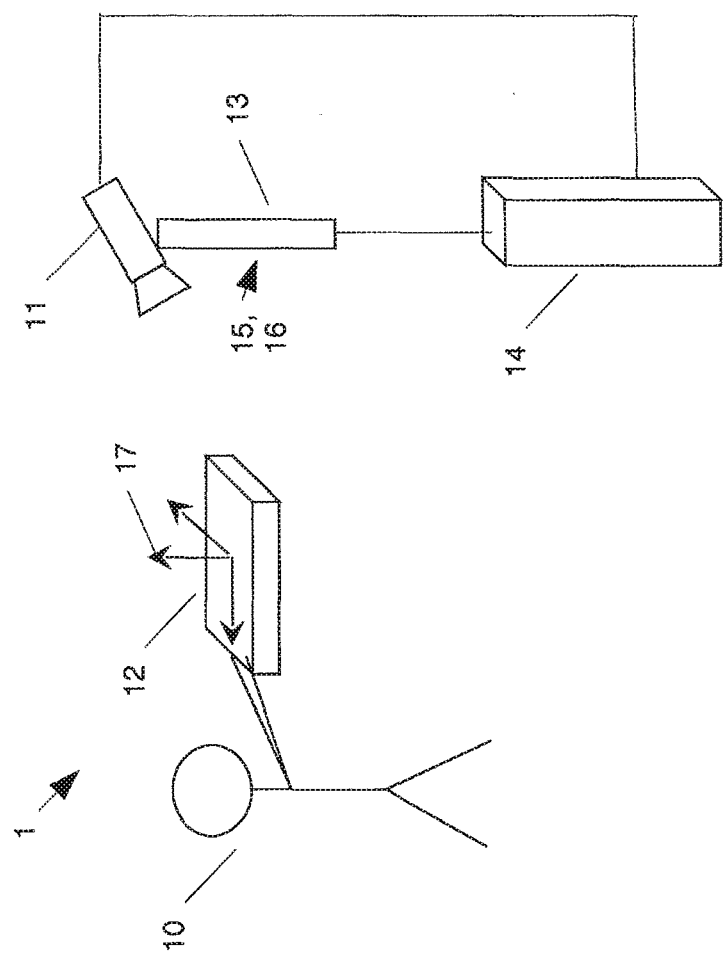
FIG. 2 shows a schematic illustration of a second embodiment of a system according to the invention.

In FIG. 2, there is shown another situation in which the system 1 substantially comprises the same components as described with reference to FIG. 1, however, in a different configuration. In the situation as shown in FIG. 2, the camera 11 is arranged opposite to the user 10, for example in front of the user 10 on an image displaying means 13, such as a display screen. By means of the camera 11, the user 10 may take images of a real object 12, such as a book, held in the user's hands or placed on a table in front of the user. The real object 12 is provided with an object coordinate system 17 similar as in FIG. 1. In the situation as shown in FIG. 2, the user 10 may move the book 12 with his or her hands in front of the camera 11, wherein the images taken by camera 11 are displayed as images on the display screen 13.

The image or images by the camera 11 are transmitted to the processing unit 14 which is adapted for performing an image analyzing process according to an embodiment of the present invention. Particularly, the processing unit 14, such as a PC, includes a computer program product having software code sections which are adapted for carrying out the process according to the invention, when the code sections are loaded into an internal memory of the PC 14. For example, the software code sections may be stored in an internal memory of the PC or may be provided on a hard disc or any other suitable storage means, wherein the program is loaded into the internal memory of the computer during operation. The camera data may be transmitted to the PC 14 in wired or wireless fashion.

Taking the magic book application as a particular exemplary embodiment of the invention, in order to augment the image with one or more virtual objects, there is the need for the processing unit 14 to identify the real object 12, such as a respective page of the book, and the position and orientation of its coordinate system 17 with respect to the camera 11 in order to correctly display the virtual object in the image taken by the camera. For this purpose, image processing and tracking algorithms, such as marker-based or markerless tracking algorithms, may be applied which are well known in the art, particularly in the augmented reality technology.

Figure 3:
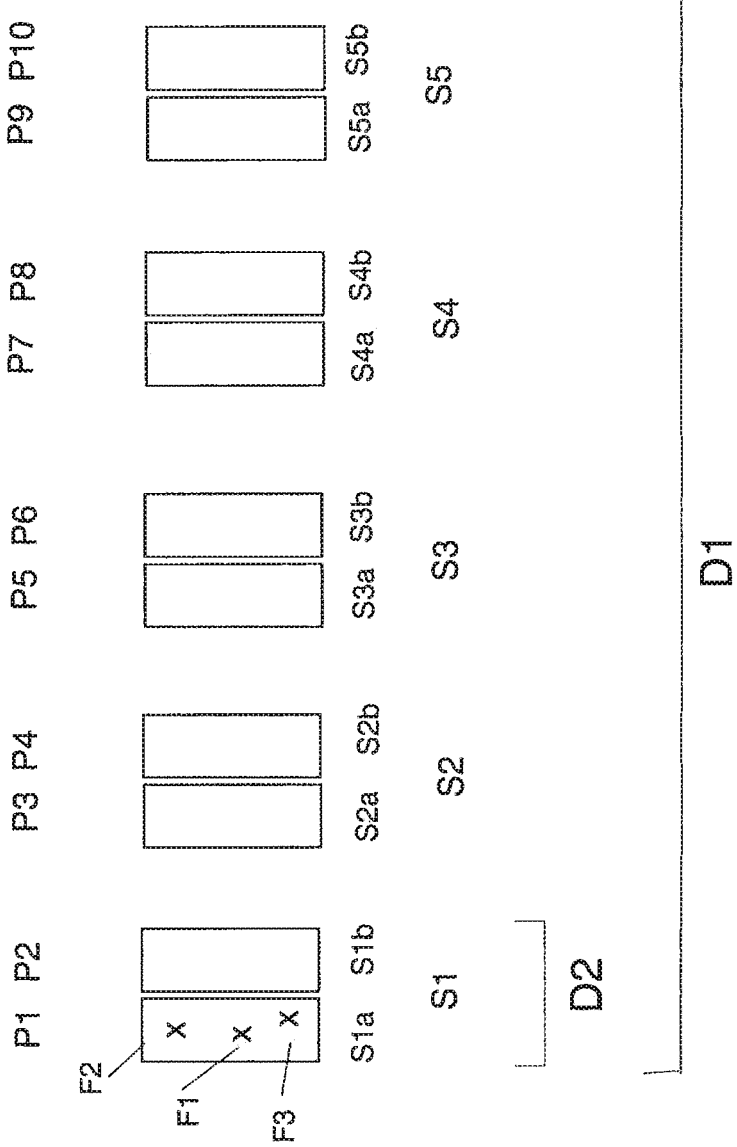
FIG. 3 shows a schematic illustration of portions of a printed media object and data sets indicative of respective portions of the printed media object.

Generally, when the camera 11 is taking a picture of the book 12, two pages of an opened double page are visible and can be viewed simultaneously. In order to identify the opened double page of the book 12 and its position and orientation, the system has to identify at least one characteristic property of the double page, such as a characteristic feature of the respective double page, which distinguishes this double page from another double page of the same book 12. For this purpose, as illustrated in FIG. 3, each double page, i.e. the pages of the book 12 which are simultaneously visible when the book is opened in front of the user, is represented by a respective data set stored in the processing unit 14. For example, a left page P1 and a right page P2 of the book 12 are forming a first double page P1/P2 which is represented by the data set S1. In other words, the data set S1 is indicative of the double page P1/P2, thus contains data or information which allows the processing unit 14 to identify the double page P1/P2 and its position and orientation (pose).

In an embodiment of the invention, the data set S1 may include two subsets S1 *a*, S1 *b*, with subset S1 *a* being indicative of page P1 and subset S1 *b* being indicative of page P2 of the book 12. In this regard, the data set S1 may include, in principal, any number of subsets.

Similarly, as the reader turns the page 1 of the book 12, the following pages P3 and P4 of the book 12 are forming a second double page P3/P4 which is represented by the data set S2, so that the data set S2 is indicative of the double page P3/P4 and its pose relative to the camera 11. Likewise, the data sets S3 to S5 are indicative of the double pages P5/P6, P7/P8 and P9/P10, respectively. Like data set S1, data sets S2 to S5 may also contain subsets S2 *a* to S5 *b* for each of the pages P3 to P10 as shown in FIG. 3. The organization of the pages and respective data sets and the number thereof is only described as a particular example, wherein the skilled person will appreciate that also other types of data structures may be used for the purposes of the invention.

When the book is positioned with an opened double page, such as P1/P2 on a table, for example, and the camera 11 is taking a first image 15 of the book 12, the image 15 displayed on the display screen 13 is capturing the double page P1/P2 opened in front of the camera 11. For identifying this double page P1/P2 of the book in order to correctly display a virtual object in the image 15 of that double page, the processing unit 14 is required to compare one or more features of the image 15 taken by the camera 11 with all of the data sets S1 to S5 stored in the processing unit 14 for the book 12, which process is rather time consuming and requires large processing performance of the computer system.

A particular aim of the present invention is to provide a methodology for analyzing an image of a real object, such as the book 12, generated by a camera which may be performed with reduced processing requirements and/or at a higher processing speed.

Figure 4:
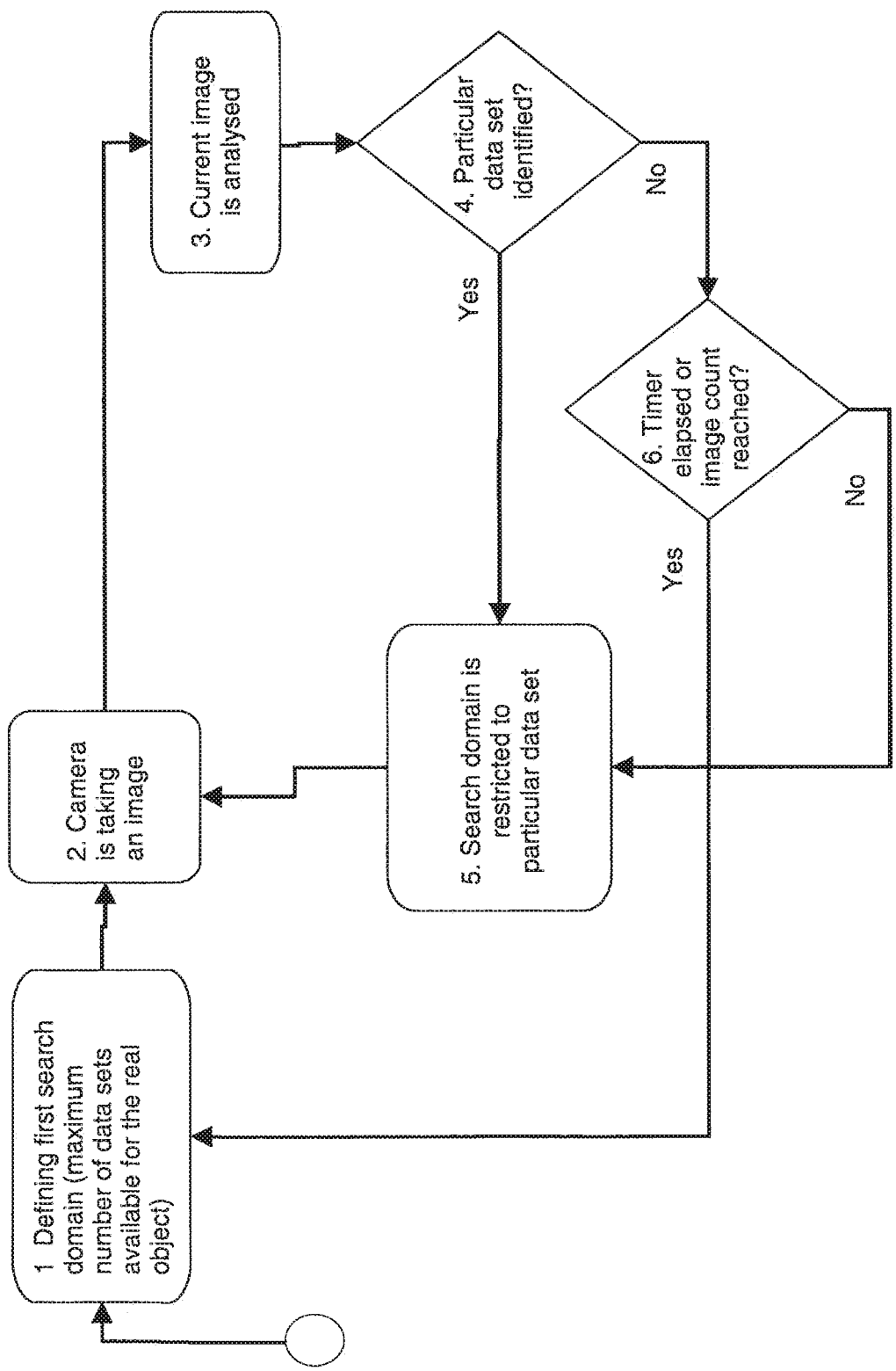
FIG. 4 shows a flowchart illustration of a method according to an embodiment of the invention.

According to FIG. 4, there is illustrated a flow chart of an embodiment of an analyzing process according to the invention which may be implemented in the processing unit 14 of the system 1 as shown in FIGS. 1 and 2.

The process starts with step 1 for defining a first search domain D1 intended to be used for analyzing at least a first image 15 taken by the camera 11. In the present example, the first search domain D1 comprises the multiple data sets S1-S5 of the book 12 as described above with respect to FIG. 3. Particularly, the search domain D1 comprises the maximum number of data sets available for the book 12, which are in the present case data sets S1 to S5. This is because the processing unit 14 does not know which of the double pages of the book is opened.

In step 2, the camera 11 is taking a first image 15. The search domain being at maximum size, the processing unit 14 in step 3 has to analyse the image 15 with respect to all data sets S1 to S5 in order to find a particular one of the data sets S1 to S5 or S1 *a* to S5 *b*, respectively, which corresponds to the opened double page or at least one of the opened pages. The processing unit 14 analyses at least one characteristic property, such as a characteristic feature of the first image 15 of the camera with respect to the first search domain D1. The result of the analyzing process is to determine whether the found characteristic property corresponds to information of at least a particular one of the data sets S1-S5 (or S1 *a* to S5 *b*, respectively) of the first search domain D1. Particularly, the processing unit 14 may perform a feature detection algorithm within a markerless tracking process to identify whether any found characteristic feature of the image 15 corresponds to information, such as features F1 to F3 shown in FIG. 3, stored in the data set S1. If no such correspondence is found, the processing unit 14 changes to data set S2 and so on until it is determined whether any one of the data sets S1 to S5 corresponds to the image 15.

In case that the found characteristic feature of image 15 corresponds to information of at least a particular one of the data sets S1 to S5 (step 4), a second search domain D2 is defined comprising, in the present embodiment, only the particular one of the data sets S1 to S5 (step 5), or particular ones of the data sets S1 *a* to S5 *b*, respectively. In the present example where each of the data sets comprises multiple data (sub-)sets, the second search domain D2 is defined to comprise only the data sets (e.g. data sets S1 *a*, S1 *b*) being indicative of at least a part of the particular double page (such as P1/P2) comprising the found characteristic feature. In this regard, it is not required that all data sets of a double page be included in the search domain D2, rather the most significant ones may be sufficient.

For example, if it is determined that the found characteristic feature of image 15 corresponds to feature F2 of data set S1 (particularly data set S1 *a*), the second search domain D2 is defined to comprise only the particular data set S1 (including data sets S1 *a*, S1 *b*), as shown in FIG. 3. This second search domain D2 is used for analyzing the first image 15 and/or at least a following second image 16 generated by the camera 11 (returning to step 2), as it is supposed that the user is remaining for a while reading the double page P1/P2 without changing quickly to any other double page. Thus, for the further analyzing process the search domain is reduced significantly. In the present example, once the feature F2 of data subset S1 *a* has been identified, the system only has to search for the other subset S1 *b* of the data set S1 defining the reduced search domain D2.

In an embodiment of the invention, the search domain D2 may also include, for example, the data set of one or more adjacent double pages, such as data set S2 in order to be prepared if the user turns page P2 to view double page P3/P4. Also, the search domain D2 may be iteratively expanded to data sets covering adjacent double pages, after having not identified a particular data set for a certain period of time or a certain amount of images captured and analyzed.

For example, if the user moves the book 12 or double page P1/P2 in a plane parallel to the table, the system can quickly follow this movement as the processing unit 14 is analyzing the following images only with respect to data set S1. Thus, the processing unit 14 can quickly associate features of the following images with corresponding features of the data set S1. Here, the invention makes use of the fact that the other double pages P3/P4, P5/P6 and so on cannot be seen by the user if double page P1/P2 has once been identified as being opened in front of the camera 11.

For example, a time period may be set for analyzing the second image 16 or any following image with respect to the second search domain D2 (step 6). In case that, within the set time period, it is determined that the respective image does not correspond to information of a particular data set comprised in the second search domain D2 (in the present example, data set S1), i.e. a particular data set of the second search domain D2 is not identified (step 4), the first search domain D1 having the maximum number of available data sets S1 to S5 is used for analyzing the respective or following images. This case can occur, for example, if the user turns the page P2 to view another double page which corresponds to another one of the data sets S1 to S5. In this case, the processing unit 14 has to search in the search domain D1 again in order to identify the corresponding data set.

Generally, according to the invention, objects belonging together (i.e. which are visible simultaneously), such as pages of a respective double page, may be grouped to a respective data set, which data sets exclude one another. If an element of a particular group or data set is visible, then elements of other groups or data sets cannot be visible, thus can be excluded when forming the second search domain.

An advantage of the invention is that the system is capable of reducing the search domain for analyzing an image of the camera. Once the system knows which group is captured by the camera, the system only searches for features of that particular group. For example, if a feature or portion of a particular double page has been found, the system only searches for other portions of the particular double page, and does not search for all of the other double pages of the book.

In an embodiment of the invention, the method may further include that the step of analyzing an image with respect to the first search domain includes a first algorithm and analyzing an image with respect to the second search domain includes a second algorithm, which is different from the first algorithm.

Particularly, it is advantageous if the first algorithm requires a less memory-intensive data structure for matching of features than the second algorithm.

Many different feature descriptors are known in the state of the art. Each descriptor, its extraction and matching algorithms have different advantages and disadvantages. For example, one descriptor might function by generating an optimized data structure, storing the characteristics of a specific feature from many different views and being able to find and match a feature, relying on that data structure being present in the memory of the processing unit. These algorithms are usually limited in the number of features they can use by the physical memory available.

Other algorithms try to calculate a compact representation of a feature, which invariant to different camera positions, light changes and other factors. They usually need less memory to describe a feature, but the description has to be calculated from every frame in the image, often using a lot of processing power.

One aspect of the invention is the possibility to apply a slower algorithm with a smaller memory footprint for a large dataset of features and to apply a faster algorithm with a larger memory footprint, once the search domain is reduced.

Algorithms with smaller memory footprints are for example: David G. Lowe, "Distinctive image features from scale-invariant keypoints", International Journal of Computer Vision, 60, 2 (2004), pp. 91-110 and Herbert Bay, Tinne Tuytelaars, Luc Van Gool, "SURF: Speeded Up Robust Features", Proceedings of the ninth European Conference on Computer Vision, May 2006 and Mikolajczyk, K., Zisserman, A. and Schmid, C., Shape recognition with edge-based features Proceedings of the British Machine Vision Conference (2003).

Algorithms with larger memory footprints are for example: V. Lepetit, P. Lagger and P. Fua, Randomized Trees for Real-Time Keypoint Recognition, Conference on Computer Vision and Pattern Recognition, San Diego, Calif., June 2005 and S. Hinterstoisser, S. Benhimane, N. Navab, P. Fua, V. Lepetit, Online Learning of Patch Perspective Rectification for Efficient Object Detection, IEEE Computer Society Conference on Computer Vision and Pattern Recognition, Anchorage, Ak. (USA), June 2008.

While the invention has been described with reference to exemplary embodiments, it will be understood by those skilled in the art that various changes may be made without departing from the scope of the claims.

The invention claimed is:
1. A method, comprising:
obtaining a first image captured by a camera, the first image comprising at least one real object;
defining a first search domain comprising a plurality of data sets corresponding to the at least one real object;
analyzing at least one characteristic property of the first image to identify a first data set of the plurality of data sets of the first search domain;
defining a second search domain comprising at least the first data set, wherein the second search domain is reduced from the first search domain;
obtaining a second image generated by the camera;
determining that the second image was captured within a predetermined time period of the first image; and
in response to determining that the second image was captured within the predetermined time period of the first image, analyzing at least one characteristic property of the second image using the second search domain to determine whether the at least one characteristic property of the second image corresponds to information of a data set of the second search domain.
2. The method of claim 1, further comprising:
obtaining a third image generated by the camera;
determining that the third image was not captured within the predetermined time period; and in response to determining that the third image was not captured within the predetermined time period, using the first search domain to determine whether at least one characteristic property of the third image corresponds to information of a data set of the first search domain.

3. The method of claim 1, wherein the second search domain is a subset of the first search domain.

4. The method of claim 1, further comprising:
determining, based on the analysis of the at least one characteristic property of the second image, a pose of the at least one real object;
augmenting the second image with a virtual object based on the pose of the at least one real object; and
presenting the augmented second image.

5. The method of claim 1, wherein the second image is augmented with at least one virtual object using an augmented reality technology.

6. The method of claim 1, wherein the at least one real object comprises a printed media object, wherein the first data set corresponds to a first set of adjacent pages in the printed media object, and wherein a third data set corresponds to a second set of adjacent pages in the printed media object.

7. The method of claim 6, wherein the second search domain comprises a plurality of data sets corresponding to contiguous sets of adjacent pages.

8. A non-transitory computer readable medium comprising computer readable code executable by one or more processors to:
obtain a first image captured by a camera, the first image comprising at least one real object;
define a first search domain comprising a plurality of data sets corresponding to the at least one real object;
analyze at least one characteristic property of the first image to identify a first data set of the plurality of data sets of the first search domain;
define a second search domain comprising at least the first data set, wherein the second search domain is reduced from the first search domain;
obtain a second image generated by the camera;
determine that the second image was captured within a predetermined time period of the first image; and
in response to determining that the second image was captured within the predetermined time period of the first image, analyze at least one characteristic property of the second image using the second search domain to determine whether the at least one characteristic property of the second image corresponds to information of a data set of the second search domain.

9. The non-transitory computer readable medium of claim 8, further comprising computer readable code to:
obtain a third image generated by the camera;
determine that the third image was not captured within the predetermined time period; and
in response to determining that the third image was not captured within the predetermined time period, use the first search domain to determine whether at least one characteristic property of the third image corresponds to information of a data set of the first search domain.

10. The non-transitory computer readable medium of claim 8, wherein the second search domain is a subset of the first search domain.

11. The non-transitory computer readable medium of claim 8, further comprising computer readable code to:

determine, based on the analysis of the at least one characteristic property of the second image, a pose of the at least one real object;
augment the second image with a virtual object based on the pose of the at least one real object; and
present the augmented second image.

12. The non-transitory computer readable medium of claim 8, wherein the second image is augmented with at least one virtual object using an augmented reality technology.

13. The non-transitory computer readable medium of claim 8, wherein the at least one real object comprises a printed media object, wherein the first data set corresponds to a first set of adjacent pages in the printed media object, and wherein a third data set corresponds to a second set of adjacent pages in the printed media object.

14. The non-transitory computer readable medium of claim 13, wherein the second search domain comprises a plurality of data sets corresponding to contiguous sets of adjacent pages.

15. A system comprising:
a camera;
one or more processors; and
one or more memories coupled to the one or more processors and comprising computer readable code executable by the one or more processors to:
obtain a first image captured by the camera, the first image comprising at least one real object;
define a first search domain comprising a plurality of data sets corresponding to the at least one real object;
analyze at least one characteristic property of the first image to identify a first data set of the plurality of data sets of the first search domain;
define a second search domain comprising at least the first data set, wherein the second search domain is reduced from the first search domain;
obtain a second image generated by the camera;
determine that the second image was captured within a predetermined time period of the first image; and
in response to determining that the second image was captured within the predetermined time period of the first image, analyze at least one characteristic property of the second image using the second search domain to determine whether the at least one characteristic property of the second image corresponds to information of a data set of the second search domain.

16. The system of claim 15, further comprising computer readable code to:
obtain a third image generated by the camera;
determine that the third image was not captured within the predetermined time period; and
in response to determining that the third image was not captured within the predetermined time period, use the first search domain to determine whether at least one characteristic property of the third image corresponds to information of a data set of the first search domain.

17. The system of claim 15, further comprising computer readable code to:
determine, based on the analysis of the at least one characteristic property of the second image, a pose of the at least one real object;
augment the second image with a virtual object based on the pose of the at least one real object; and
present the augmented second image.

18. The system of claim 15, wherein the second image is augmented with at least one virtual object using an augmented reality technology.

19. The system of claim 15, wherein the at least one real object comprises a printed media object, wherein the first data set corresponds to a first set of adjacent pages in the printed media object, and wherein a third data set corresponds to a second set of adjacent pages in the printed media object.

20. The system of claim 19, wherein the second search domain comprises a plurality of data sets corresponding to contiguous sets of adjacent pages.

\* \* \* \* \*